Figure 1:
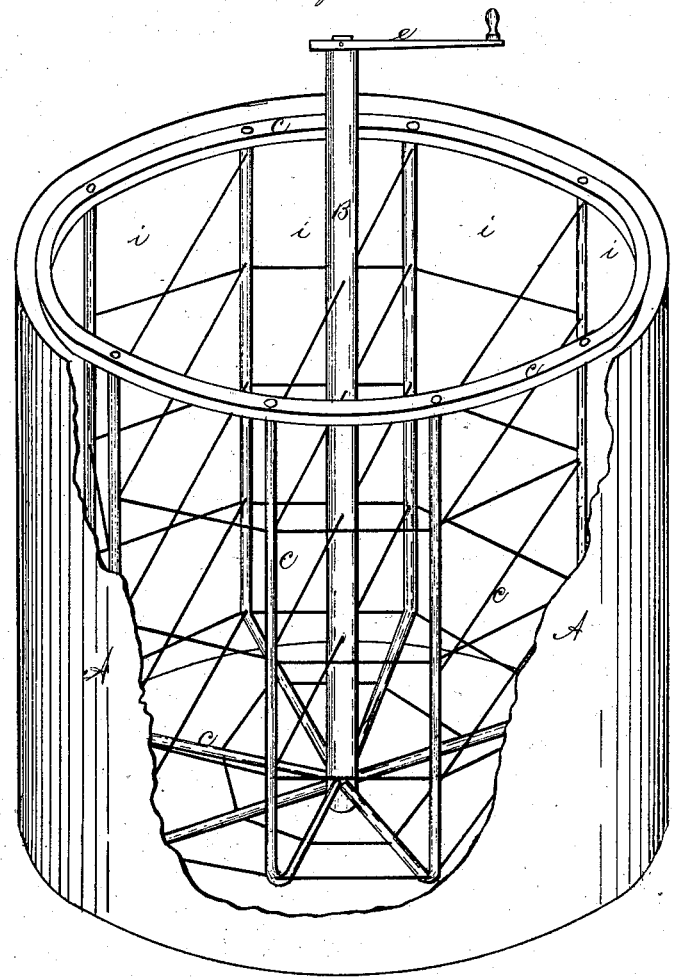

No. 104,235.

PATENTED JUNE 14, 1870.

G. A. WELLS.
DISH WASHER.

Witnesses
Thos. H. Hutchins
Henry Lowe

Inventor
Glory Ann Wells

United States Patent Office.

GLORY ANN WELLS, OF LUZERNE, NEW YORK.

Letters Patent No. 104,235, dated June 14, 1870.

IMPROVED DISH-WASHER.

The Schedule referred to in these Letters Patent and making part of the same.

Be it known that I, GLORY ANN WELLS, of Luzerne, Warren county, and State of New York, have invented a new and useful Machine for Washing and Rinsing Dishes; and I do hereby declare the following to be a full, clear, and exact description of the same, reference being had to the annexed drawing, in which—

Figure 1 is a perspective view of the machine.

My invention consists of a vessel, A, in which stands the basket c, attached to the central vertical shaft B, as shown. This basket c is constructed of wire, and is caused to revolve by means of the handle e.

The mode of operation is as follows:

The dishes are set into the basket e edgewise, in the divisions or compartments marked i, until a sufficient number is put in to work with ease. The vessel A is then set on the stove or over a fire, and filled with water to cover the dishes. When the water is hot the basket is caused to revolve, by means of the handle e, which causes the water to pass among the dishes with sufficient force to wash off the dirt, when the water is changed and the same operation performed to rinse the dishes, after which the basket is lifted out and set one side, with the dishes left sitting in to dry. Thus the dishes are thoroughly and quickly washed, without the necessity of putting the hands into the dish-water or wiping.

The whole is intended to be covered while in operation by a cover, through the center of which the shaft B passes to hold it in place.

Having thus described my invention,

What I claim as new, and desire to secure by Letters Patent, is as follows:

Claim.

The combination of the basket c and vessel A, constructed, operating, and arranged substantially as and for the purposes set forth.

GLORY ANN WELLS.

Witnesses:
    THOS. H. HUTCHINS,
    HENRY LOWE.